United States Patent
Nyberg

(10) Patent No.: US 6,279,874 B1
(45) Date of Patent: Aug. 28, 2001

(54) COUPLING FOR HOSES OR THE LIKE

(75) Inventor: Kent Nyberg, Skovde (SE)

(73) Assignee: Bo Erik Nyberg, Oberageri (SE)

( * ) Notice: Subject to any disclaimer, the term of this patent is extended or adjusted under 35 U.S.C. 154(b) by 0 days.

(21) Appl. No.: 09/142,921

(22) PCT Filed: Mar. 20, 1997

(86) PCT No.: PCT/SE97/00473

§ 371 Date: Dec. 17, 1998

§ 102(e) Date: Dec. 17, 1998

(87) PCT Pub. No.: WO97/35143

PCT Pub. Date: Sep. 25, 1997

(30) Foreign Application Priority Data

Mar. 22, 1996 (SE) .................................................. 9601127

(51) Int. Cl.$^7$ .................................................. F16L 37/28
(52) U.S. Cl. .................................. 251/149.6; 137/614.03; 137/614.05
(58) Field of Search .................... 251/149.6, 149.1, 251/149; 137/614.03, 614, 614.06, 614.05; 285/317, 316

(56) References Cited

U.S. PATENT DOCUMENTS

| | | | | |
|---|---|---|---|---|
| 2,888,278 | * | 5/1959 | Torres et al. ........................... | 285/313 |
| 2,952,482 | * | 9/1960 | Torres ................................... | 285/313 |
| 3,680,591 | * | 8/1972 | Vik ...................................... | 137/614.03 |
| 4,124,228 | * | 11/1978 | Morrison ............................... | 137/614.03 |
| 4,483,510 | * | 11/1984 | Palau et al. ........................... | 251/149.6 |
| 4,564,042 | * | 1/1986 | Ekman .................................. | 137/614.03 |
| 4,685,490 | * | 8/1987 | Medvick et al. ...................... | 137/614.03 |
| 4,691,941 | * | 9/1987 | Rabushka et al. .................... | 285/316 |
| 4,863,201 | * | 9/1989 | Carstens ............................... | 285/317 |
| 4,982,761 | * | 1/1991 | Kreczko et al. ....................... | 137/614.03 |
| 5,123,448 | * | 6/1992 | Kjellberg et al. ..................... | 251/149.6 |
| 5,179,976 | * | 1/1993 | Boland et al. ........................ | 251/149.6 |
| 5,323,812 | * | 6/1994 | Wayne ................................... | 137/614.05 |
| 5,337,782 | * | 8/1994 | Wilcox ................................. | 251/149.6 |
| 5,482,083 | * | 1/1996 | Jenski .................................. | 137/614.03 |
| 5,535,985 | * | 7/1996 | Larbuisson ........................... | 251/149.9 |
| 5,547,166 | * | 8/1996 | Engdahl .............................. | 251/149.6 |
| 5,592,970 | * | 1/1997 | Stucchi et al. ....................... | 137/614.03 |

FOREIGN PATENT DOCUMENTS 470452   4/1994 (SE) .
95025979 1/1997 (SE) .

* cited by examiner

Primary Examiner—A. Michael Chambers

(57) ABSTRACT

A coupling for connecting hoses to a medium under pressure includes a female part having a nipple release mechanism and at least one ball-type nipple locking member for initially locking a nipple in place within the female part, an axially displaceable valve member centrally located and movable in the female part from a closed position in contact with an annular valve seat and an open position away from the valve seat, a nipple insertable in the female part and having a groove in an outer surface region thereof adapted to initially engage the ball-type nipple locking member for locking the nipple in place in the female part upon insertion. The female part additionally includes an elongated rotatable arm having a rounded distal end for contacting the groove in the nipple for holding the nipple in place at an intermediate position consisting of a partial removal of the nipple from the female part upon subsequent activation of the nipple release mechanism until pressure inside the nipple drops below a predetermined pressure level.

10 Claims, 1 Drawing Sheet

COUPLING FOR HOSES OR THE LIKE

This application is the national phase under 35 U.S.C. §371 of prior PCT Internationt Application No. PCT/SE97/00473 which has an International filing date of Mar. 20, 1997 which designated the United States of America, the entire contents of which are hereby incorporated by reference.

The invention relates to a couping for connecting hoses or the like for a medium under pressure in accordance with the preamble to claim 1.

Detachable couplings for connecting hoses or the like for pressure media are used extensively in industry and handicrafts, especially couplings for compressed air. Such couplings are often used for connecting a compressed air tool or the like to a compressed air source. The female part of the coupling has a valve element which makes it possible to keep the hose leading to the female part continuously under pressure. The nipple of the coupling is connected to a hose or the like which leads to a compressed air tool. When changing tools or detaching the tool from the compressed air source for some other reason, there is often relatively high pressure there. When the nipple is disconnected from the female part, there is powerful recoil throwing the nipple in the hose connected thereto. There is also a loud noise at disconnection. Both the recoil force and the sound are disadvantages which should be removed for,among other things, reasons of safety.

The purpose of the present invention is to achieve a coupling of the type described by way of introduction which removes the above mentioned disadvantages and makes possible disconnection of the nipple from the female part while the coupling is under pressure, without any recoil or noise.

This is achieved according to the invention by means of a coupling which is characterized by the features disclosed in the characterizing portion of claim 1.

Suitable embodiments of the coupling according to the invention are disclosed in the subclaims.

Figure 1:
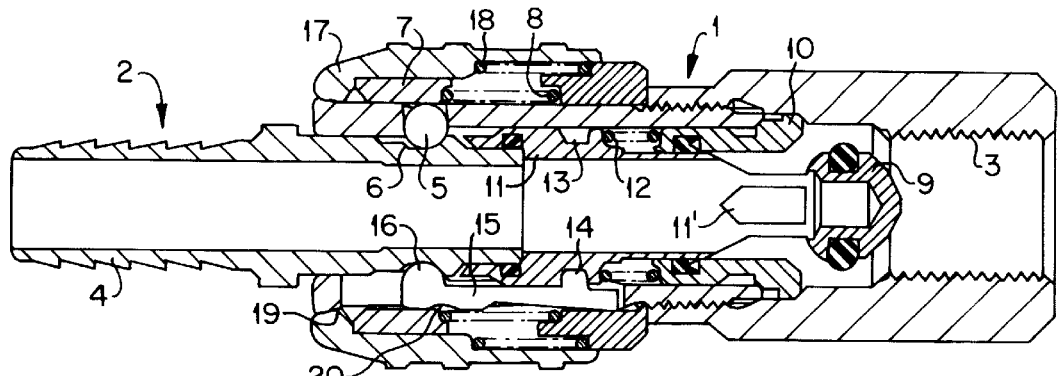
Figure 2:
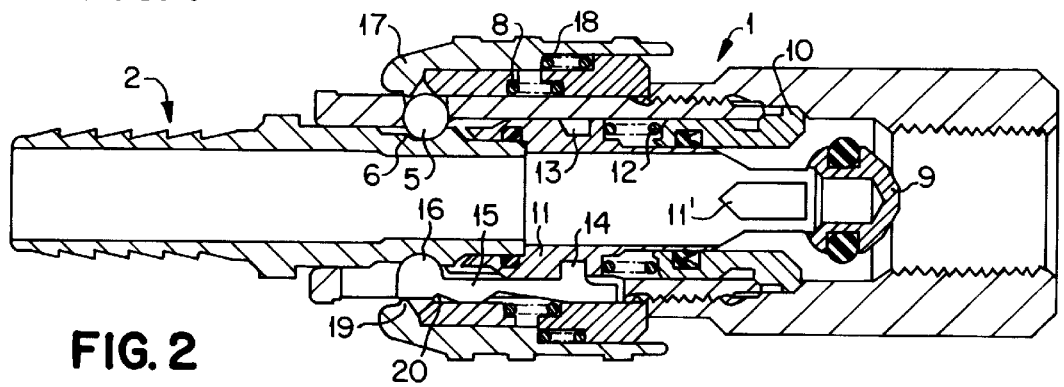
Figure 3:
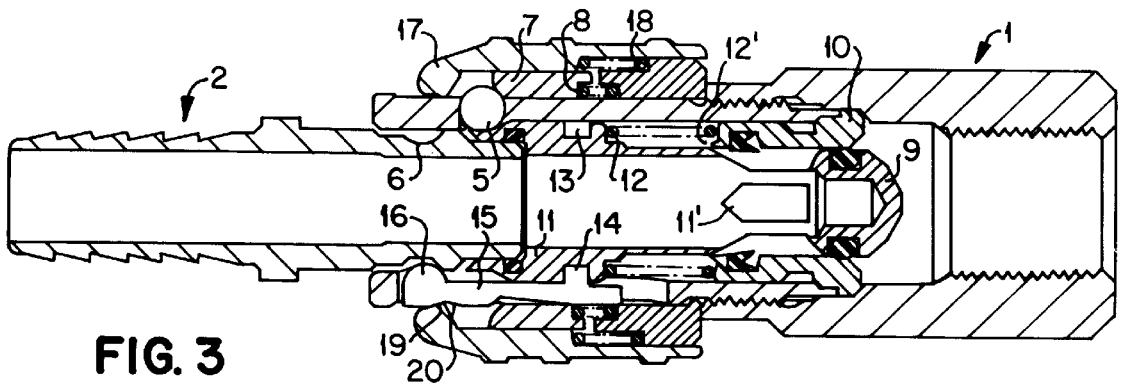
Figure 4:
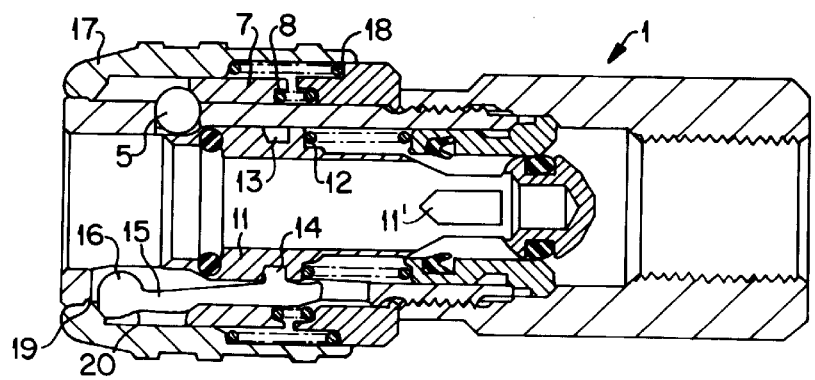

The invention will be described in more detail below with reference to the accompanying drawing, in which FIG. 1 shows a longitudinal section through a coupling according to one embodiment of the invention in its connected state, FIG. 2 shows the coupling according to FIG. 1 at the beginning of the disconnecting process, FIG. 3 shows the coupling of FIGS. 1 and 2 in an intermediate position during a disconnecting process, and FIG. 4 shows the female part of the coupling shown in FIGS. 1–3 after disconnection of the nipple.

The coupling shown in the drawing comprises a female part 1 and a nipple 2 insertable therein. The female part 1 is provided with an attachment means 3 for a hose or a pipe, and the nipple 2 is provided with attachment means 4 for insertion into a hose. The female part 1 is intended to be connected to a pressure medium source (not shown) while the nipple 2 is intended to be connected via hose to a tool or the like (not shown).

A ball lock means of a type known per se with a number of balls 5 distributed about the periphery and disposed in radial openings in the female part 1 and cooperating with a circumferential groove 6 in the nipple, is arranged in the vicinity of the free end of the female part 1. The functioning of this ball lock means is well known and the ball lock means is used to lock the nipple 2 in its inserted position in the female part 1, as shown in FIG. 1. The balls 5 are kept pressed into the groove 6 by means of a ring 7, which is axially movable along the outside of the female part 1 and which is biased by means of a spring 8 towards the locking position shown in FIG. 1.

The nipple 2 is hollow and keeps a valve element 9, in the position shown in FIG. 1, spaced from a valve seat 10 within the female part 1. The valve element 9 is provided for this purpose with an elongated hollow extension member 11 which is provided with radial openings 11' adjacent the valve element proper 9 to make possible flow of medium through the coupling. In this position shown in FIG. 1, the nipple 2. via the elongated extension member 11 has moved the valve body 9 away from the valve seat 10, by compressing a spring 12.

The extension member 11 is provided at its buter surface with a peripheral groove 13, into which there extends a shoulder 14 at one end of an arm 15. The drawing shows only one arm 15, but in practice the female part 1 is provided with a plurality of such arms spaced circumferentially. At the end of the arm 15 remote from the shoulder 14 there is a rounded projection 16, which in the engaged position shown in FIG. 1 extends into the groove 6 in the nipple 2.

In the position shown in FIG. 2, a disengaging process has just began. A sleeve 17, which is biased by a spring 18 to the coupled position shown in FIG. 1. has been moved away from the free position of the female part 1. The ring 7 has followed the sleeve 17 against the force of its spring 8, so that a a bevelled end of the ring 7 cooperates with the balls 5. In this position, the balls 5 can move radially outwards and thus press the ring 7 further backwards against the force of the spring 8. A projection 19 on the sleeve 17 abuts against the radially outer surface of the arm 15 and keeps it in engagement with the groove 6 in the nipple 2.

When the nipple 2, as a result of the force of the spring 12 is pressed by the elongated extension member 11 of the valve element 9, axially out of the female part 1, the balls 5 will be pressed radially outwards from the groove 6 by virtue of the fact that the edges of the groove 6 are oblique. The nipple 2 is thereby freed to move axially out of the female part 1 until it reaches the position shown in FIG. 3. In this position the valve element 9 has been moved into sealing engagement with the valve seat 10, so that no flow of medium is possible through the female part 1. The arm 15 is however, retained with its projection 16 extending into the groove 6 because the projection 19 on the sleeve 17 will not permit the arm 15 and its projection 16 to move radially outwards. The nipple 2 is thus held in an intermediate position. Pressure medium in the nipple 2 and in the hose connected thereto can thus exit through the gap 12' between the extension member 11 of the valve element 9 and the female part 1 into the surroundings. The pressure in the nipple 2 providing the axial force on the nipple 2 away from the female part 1 drops of course. This force exerts a radially outwardly directed force on the projection 16 and the arm 15. The arm 15 is provided with a depression 20 with oblique edges, into which the projection 19 of the sleeve 17 extends. The radially outwardly directed force on the arm 15 holds the sleeve 17 in the position shown in FIG. 3 until the internal pressure in the nipple 2 has dropped to a predetermined level. When this level has been passed, the force on the spring 18 will overcome the radially outwardly directed force on the arm 15, so that the projection 19 can be moved out of the depression 20. The spring 18 can thereafter displace the sleeve 17 to the position shown in FIG. 4, in which the arm 15 can pivot radially outwards to thus free the nipple 2 for removal from the female part 1.

The process described above enables the nipple 2 to be removed from the female part 1 in a controlled and satisfactory manner even if the interim pressure in the coupling is relatively high. In summary, it can be said that the nipple 2 is first moved to an intermediate position partial removal as shown in FIG. 3, in which the valve element 9 seals against the valve seat 10, whereafter the internal pressure on the nipple 2 and the portions connected thereto will be allowed to drop in a controlled manner by releasing to the surroundings via the gap 12'. When the internal pressure has dropped to a certain level pressure, which can be determined by suitable dimensioning of the components, the nipple 2 is released for complete removal from the female part 1 when the arm 15 pivots outwardly from the nipple groove. In this manner, both noise andthe powerful recoil are avoided, which means that the disengagement can be done in a satisfactory manner as regards safety and convenience.

The invention is of course not limited to the embodiment described above. However, it can be modified within the scope of the attached patent claims.

What is claimed is:

1. A coupling for connecting hoses or the like to a medium under pressure, comprising:
    a female part including a nipple release mechanism and at least one ball-type nipple locking member for initially locking a nipple in place within the female part;
    an axially displaceable valve member centrally located and movable in the female part from a closed position in contact with an annular valve seat and an open position away from the valve seat; and,
    a nipple insertable in the female part and including an outer surface region adapted to initially engage the ball-type nipple locking member for locking the nipple in place in the female part upon insertion;
    said female part additionally including a restraining member for holding the nipple in place at an intermediate position consisting of a partial removal of the nipple from the female part upon subsequent activation of the nipple release mechanism together with movement of the valve member to the closed position against the valve seat and thereafter releasing the nipple for complete removal from the female part in response to pressure inside the nipple dropping below a predetermined pressure level.

2. A coupling according to claim 1 wherein said valve member is biased so as to be in the closed position in absence of the nipple or the removal thereof from the female part.

3. A coupling according to claim 2 wherein said ball-type nipple locking member comprises a ball member and said surface region of said nipple comprises a groove formed in an outer surface of the nipple for receiving said ball member.

4. A coupling according to claim 3 wherein said nipple release mechanism comprises a slideable body member located on an outer portion of the female part and providing an access opening adjacent the ball member when actuated for receiving the ball member so as to permit removal of the nipple from the female part upon a subsequent release thereof by said restraining member.

5. A coupling according to claim 4 wherein said nipple release mechanism comprises a spring loaded slideable sleeve assembly which restrains the ball member so as to be in contact with said surface region of the nipple in absence of an actuation of the nipple release mechanism.

6. A coupling according to claim 5 wherein said restraining member comprises an elongated rotatable arm mounted on the female part and located beneath the slideable sleeve assembly, and having a rounded distal end portion of a size corresponding to the ball member for contacting said groove in the nipple.

7. A coupling according to claim 6 wherein said arm includes a depressed region on an outer surface adjacent the rounded end portion and said sleeve assembly includes an inwardly facing projection in an outer end portion thereof for engaging the depressed region of the arm when the sleeve assembly is manually moved in an axial direction and thereby temporarily locking the nipple in place, and thereafter becoming disengaged upon release of the sleeve assembly so as to allow the rounded end portion of the arm to move out of the groove in the surface region of the nipple when the pressure drops below said predetermined level.

8. A coupling according to claim 1 and additionally including a bias spring member located between the valve member and the female part for biasing the valve member to the closed position in absence of the nipple or the removal thereof from the female part but permitting the valve member to move to the open position upon the insertion of the nipple in the female part.

9. A coupling for connecting hoses or the like to a medium under pressure, comprising:
    a female part including a nipple release mechanism and at least one ball-type nipple locking member for initially locking a nipple in place within the female part;
    an axially displaceable valve member centrally located and movable in the female part from a closed position in contact with an annular valve seat and an open position away from the valve seat; and,
    a nipple insertable in the female part and including a groove in an outer surface region adapted to initially engage the ball-type nipple locking member for locking the nipple in place in the female part upon insertion;
    said female part additionally including a restraining member for holding the nipple in place at an intermediate position consisting of a partial removal of the nipple from the female part upon subsequent activation of the nipple release mechanism together with movement of the valve member to the closed position against the valve seat and thereafter releasing the nipple for complete removal from the female part in response to pressure inside the nipple dropping below a predetermined pressure level; and
    wherein said restraining member comprises an elongated rotatable arm mounted on the female part and located beneath the slideable sleeve assembly, and having a rounded distal end portion of a size corresponding to the ball member for contacting said groove in the nipple.

10. A coupling for connecting hoses or the like to a medium under pressure, comprising:

a female part including a nipple release mechanism and at least one ball-type nipple locking member for initially locking a nipple in place within the female part;

an axially displaceable valve member centrally located and movable in the female part from a closed position in contact with an annular valve seat and an open position away from the valve seat; and, a nipple insertable in the female part and including an outer surface region adapted to initially engage the ball-type nipple locking member for locking the nipple in place in the female part upon insertion;

said female part additionally including a restraining member for holding the nipple in place at an intermediate position consisting of a partial removal of the nipple from the female part upon subsequent activation of the nipple release mechanism together with movement of the valve member to the closed position against the valve seat and thereafter releasing the nipple for complete removal from the female part in response to pressure inside the nipple dropping below a predetermined pressure level;

wherein said ball-type nipple locking member comprises a ball member and said surface region of said nipple comprises a groove formed in an outer surface of the nipple for receiving said ball member; and wherein said nipple release mechanism comprises a slideable body member located on an outer portion of the female part and providing an access opening adjacent the ball member when actuated for receiving the ball member so as to permit removal of the nipple from the female part upon a subsequent release thereof by said restraining member.

* * * * *